United States Patent Office

2,951,015
Patented Aug. 30, 1960

2,951,015

AQUEOUS READILY INJECTABLE THERAPEUTIC COMPOSITIONS CONTAINING WATER-INSOLUBLE PENICILLIN AND SUCROSE DILAURATE

Melvin L. Berger, Flushing, N.Y., assignor to Chas. Pfizer & Co. Inc., Brooklyn, N.Y., a corporation of Delaware No Drawing. Filed July 2, 1957, Ser. No. 669,420

7 Claims. (Cl. 167—82)

This invention is concerned with new therapeutic compositions. In particular, it is concerned with antibiotic dosage forms comprising aqueous suspensions of water-insoluble forms of penicillin. More specifically, it relates to highly concentrated aqueous suspensions of that antibiotic which, despite their high concentration, are fluid and readily injectable.

The aqueous suspension of water-insoluble forms of penicillin has presented serious problems. On the one hand, high concentrations of this class of compounds, with or without compatible water—soluble antibiotics, such as streptomycin and dihydrostreptomycin, render the suspensions difficult or even impossible to manipulate through a standard syringe for injection. On the other hand, however, high concentrations of antibiotic in a unitary dosage are frequently desired in therapy for injection purposes. The water-insoluble forms of penicillin are generally preferred over the water-soluble forms because they are more slowly absorbed in the body and consequently higher blood levels are maintained over longer periods of time. For instance, a serious loss of fluidity is encountered when it is desired to employ above 200,000 units per cc. of procaine penicillin, and yet it is very common today for physicians to treat various infections, by a one-shot injection of 300,000 or more units of procaine penicillin. Similar difficulties are encountered where high concentrations of the other substantially water-insoluble forms of penicillin are used, e.g. dibenzylethylenediamine penicillin, N-benzyl-N'-(3-ethoxy-4-hydroxy)-benzyl-ethylenediamine penicillin, 2-chloroprocaine penicillin, N,N'-di-(4-methoxybenzyl)-ethylenediamine penicillin, and the like. An even more serious problem occurs when the penicillin salts are in admixture with a streptomycin-type antibiotic. Thus, above 200 mg./cc. of streptomycin renders an aqueous suspension but difficultly syringeable.

It is accordingly an object of the present invention to prepare novel aqueous suspensions of water-insoluble penicillin, with or without other, penicillin-compatible antibiotics, which are fluid and consequently readily syringeable, even when the suspensions contain high concentrations of antibiotic. This and other objects are realized by incorporating in the suspensions a small proportion of sucrose dilaurate. The resulting compositions remain fluid and may be readily administered by syringe. The concentration of the diester should be about 0.01% to 1.0% by weight based on the weight of the antibiotic content. Preferably, it should be about 0.02% to 0.05% by weight. Hence, it is possible to give high concentrations of the valuable penicillin antibiotics in much smaller volumes than was heretofore possible. Alternatively, for the same volume a much higher dosage level of penicillin can be administered. The advantages thus obtained are obvious.

If a small proportion of urea is incorporated into these suspensions, the compositions have improved activity, stability or even greater fluidity. The amount of urea should be between about 0.5% and 10.0% by weight of the antibiotic content. Likewise, the addition of a small amount of a chelating agent such as Versene (ethylenediamine tetraacetic acid) also may improve the stability, tying up any undesirable stray heavy metal ions. The proportion of Versene which is best employed is generally from about 0.0001% to about 0.01% by weight, based on the weight of the antibiotic content.

The formation of sucrose dilaurate is accomplished by an ester interchange reaction between the sugar and the fat and may be catalyzed by various basic substances. The sugar and the fat are dissolved in a suitable solvent, the catalyst is added, and the mixture is heated until equilibrium is reached. Completion of the reaction is indicated when the unreacted sugar content and the surface tension-reducing properties of the mixture reach constant values. Suitable basic catalysts are, e.g., potassium carbonate and sodium methoxide. Typical solvents are dimethylformamide, acetone, chloroform, lower alkanols, etc. Following is a specific example for the preparation of the sucrose dilaurate.

One mole (342 g.) of dry sucrose was dissolved in 1500 ml. of dimethylformamide by warming. Fifteen grams of anhydrous potassium carbonate and 437 g. (2.0 moles) of methyl laurate were added and the resulting solution was maintained at 90–95° C. for 24 hours at a pressure of 95–120 mm. while distilling off methanol continuously. The catalyst was then neutralized with a mineral acid and the solvent distilled in vacuo. The residue was taken up in 1500 ml. of n-butanol, and the butanol solution was washed with 10% sodium chloride solution to remove unreacted sucrose. The organic layer was evaporated in vacuo to remove the n-butanol and the residue was dissolved in 2.5 liters of acetone. The acetone solution was filtered to remove insoluble material and the filtrate concentrated to a syrup which was allowed to stand overnight. The following day it was dried in a vacuum oven to afford 420 g. of amorphous solid, the desired dilaurate ester.

This product had the following properties:

Saponification equivalent _____ 350,344.[1]
Volatiles _____ 0.31%.
Sulfated ash _____ 1.3%.
Nitrogen _____ 0.5%.
Water (Karl Fisher) _____ 0.5%.
Free fatty acids _____ 0.61% (as lauric).
$[\alpha]_D^{25}$ +37.0° (C=4, n-butanol).

[1] Theoretical value is 353.

The fact that the sucrose dilaurate imparts such amazing fluidity to penicillin suspensions is all the more surprising since other sucrose esters, including the monolaurate, do not significantly affect the fluidity of these compositions. Furthermore, the dilaurate has no apparent effect on viscosity.

As hereinbefore indicated, it is readily feasible, and often desirable, for the new therapeutic compositions to contain other antibiotics besides the penicillin salts. For instance, streptomycin and/or dihydrostreptomycin are customarily employed with penicillin in various unitary dosage forms; however, at high concentrations the syringeability of such aqueous suspensions becomes extremely poor and some suspensions cannot be syringed at all. The sucrose dilaurate is particularly useful for imparting fluidity to suspensions containing such mixtures. Generally the greatest fluidizing advantages of the sucrose dilaurate are obtained with aqueous suspensions containing 200,000 or more units per cc. of penicillin in the form of one or more of its water-insoluble salts. Preferred formulations may contain as much as 600,000 units per cc. and, if sufficient of the sucrose ester is employed, the resulting suspension will still be readily syringeable. Similarly, the dilaurate easily fluidizes suspensions containing as much as from about 200 to about 500 mg./cc. of streptomycin or dihydrostreptomycin.

The following examples are given to illustrate the present invention, but are not to be considered as limiting the same.

*Example I*

A diluent was prepared as follows: 19 grams of sodium citrate, 1 gram of sodium bisulfite, 1½ grams of sodium formaldehyde sulfoxalate, 3 grams of phenol, 156 grams of 70% sorbitol in water, and 467 grams of water were thoroughly mixed until the chemicals were dissolved. The solution was then filtered.

Eighteen grams of procaine penicillin and 30 grams of dihydrostreptomycin sulfate mixed in 37 grams of this diluent, after which 0.01 gram of sucrose dilaurate was added. After thorough mixing, the fluid was passed through a silk sleeve and subdivided into 2 cc. lots. This suspension remained stable for many months, consistently assaying at room temperature about 200,000 u./cc. of penicillin and 0.25 gram/cc. of dihydrostreptomycin. It readily passed through a 20-gauge needle.

*Example II*

To the composition of Example I, prior to the addition of the dilaurate, were added 2.2 grams of urea. The remaining ingredients and procedure were the same as in Example I. A composition of improved stability in activity and even more improved syringeability was obtained.

When 0.03 gram of a solution of a chelating agent, containing 50% Versene by weight/volume, was added with the dilaurate in the same procedure, the stability of the solution was still further improved.

|  | Units/2 cc. | |
| --- | --- | --- |
| Initial assay: | | |
| Penicillin | 416,000 | |
| Dihydrostreptomycin | 474,000 | |
| Syringeability—very satisfactory on 20 gauge needle. | | |

|  | 45° C. | 37° C. |
| --- | --- | --- |
| 1 week: | | |
| Penicillin | 416,000 | |
| Dihydrostreptomycin | 508,000 | |
| 2 weeks: | | |
| Penicillin | 360,000 | |
| Dihydrostreptomycin | 564,000 | |
| 3 weeks: | | |
| Penicillin | 365,900 | 422,000 |
| Dihydrostreptomycin | 530,000 | 512,000 |
| 6 weeks: | | |
| Penicillin | 99,960 | 389,000 |
| Dihydrostreptomycin | 515,250 | 515,000 |
| 9 weeks: | | |
| Penicillin | | 368,100 |
| Dihydrostreptomycin | | 515,250 |

*Example III*

The procedure of Example I was repeated, simply employing 50 grams of streptomycin sulfate in lieu of the 30 grams of dihydrostreptomycin sulfate. The resulting suspension also remained fully potent and easily syringeable via a 20-gauge needle for months.

The procedure of Example I was repeated yet again, but omitting the streptomycin-type antibiotic entirely. A suspension having substantially the same excellent fluidity and penicillin potency properties was obtained.

What is claimed is:

1. A readily injectable therapeutic composition comprising an aqueous suspension of a substantially water-insoluble penicillin and a small proportion of sucrose dilaurate.

2. A composition as in claim 1 wherein the substantially water-insoluble penicillin is procaine penicillin.

3. A composition as in claim 1 wherein the substantially water-insoluble penicillin is dibenzylethylenediamine penicillin.

4. A composition as in claim 1 wherein the sucrose dilaurate is present in an amount between about 0.01% and about 1.0% by weight of the water-insoluble penicillin.

5. A composition as in claim 1 which also contains a water-soluble antibiotic compatible with the penicillin.

6. A readily injectable therapeutic composition comprising between about 200,000 and 600,000 units per cc. of procaine penicillin, between about 200 and 500 mg./cc. of a streptomycin-type antibiotic, and between about 0.01 and 1.0% sucrose dilaurate by weight of the total antibiotic content, in an aqueous buffered diluent.

7. A composition as in claim 6 which also contains from about 0.5 to about 10.0% of urea by weight of the total antibiotic content.

References Cited in the file of this patent

UNITED STATES PATENTS

| 2,487,600 | Schneiderwirth | Nov. 8, 1949 |
| 2,749,274 | Buckwalter | June 5, 1956 |
| 2,893,990 | Hass et al. | July 7, 1959 |